July 4, 1950 A. CARSON ET AL 2,513,400
DIGIT ABSORBING SELECTOR
Filed Aug. 17, 1948
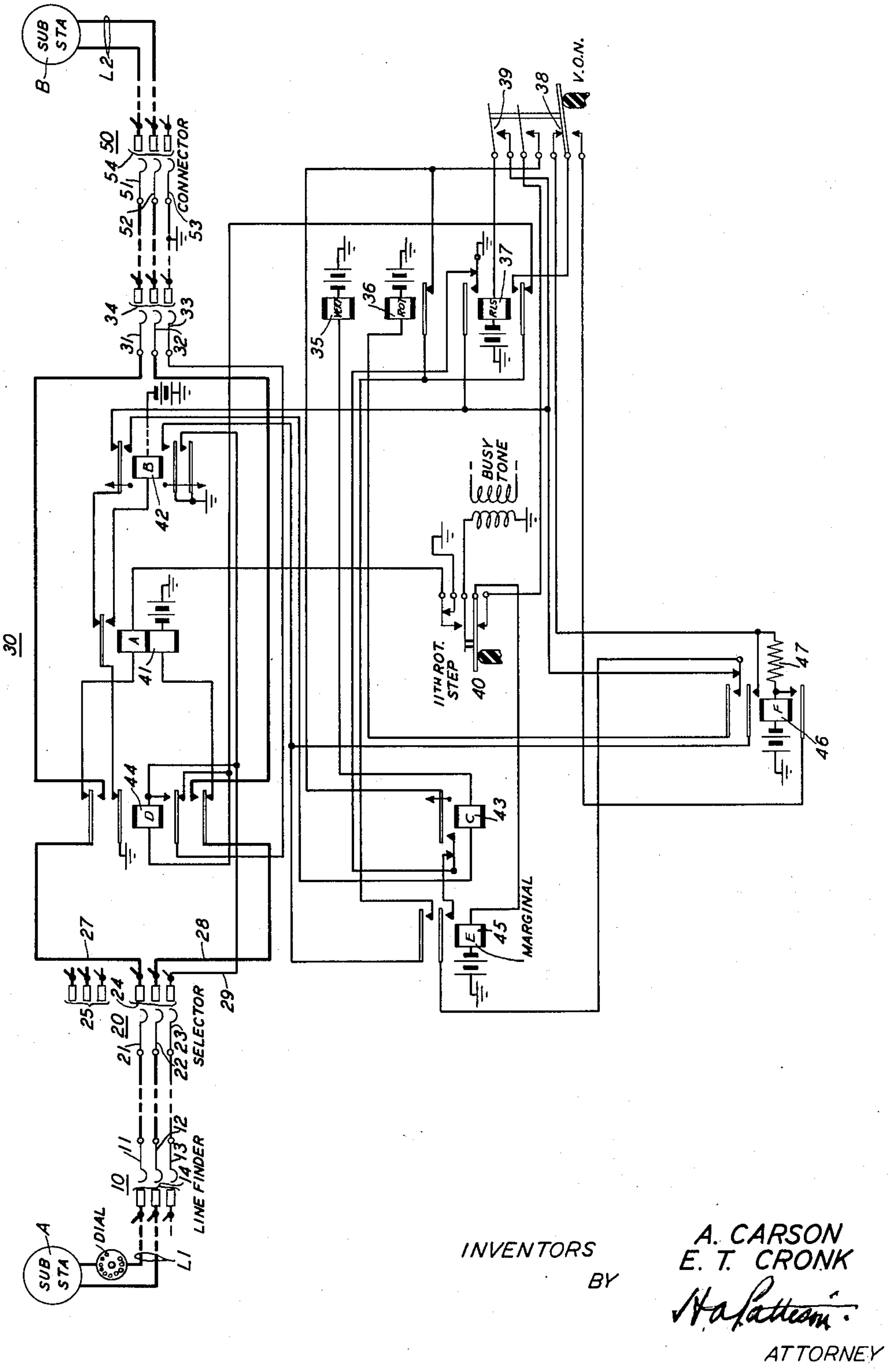
INVENTORS A. CARSON
E. T. CRONK
BY H. A. Patterson
ATTORNEY Patented July 4, 1950

2,513,400

UNITED STATES PATENT OFFICE 2,513,400

DIGIT ABSORBING SELECTOR

Arthur Carson and Earle Tabor Cronk, Richmond, Va., assignors to American Telephone and Telegraph Company, a corporation of New York Application August 17, 1948, Serial No. 44,666

3 Claims. (Cl. 179—18)

This invention relates to telephone systems and particularly to systems comprising two-motion step-by-step switches for use in establishing connections between calling and called telephone stations.

The object of the invention is the provision of automatic switching equipment which enables an improved and efficient trunking arrangement in telephone systems having uniform numbering schemes.

It has heretofore been found desirable in automatic telephone systems to provide means for absorbing one or more digits of certain called numbers; and selector switches of the two-motion step-by-step type have been variously arranged to absorb one or more digits of any desired numerical value once only or to absorb such digits one after the other until a digit of some other numerical value is received. In some cases, digit absorbing is effected by vertical movement of the shaft and brushes of a two-motion step-by-step switch responsive to the impulses of a train corresponding to a digit to be absorbed, followed by release of the shaft and brushes to normal position. This invention is a new and improved step-by-step switch arranged to absorb two digits by drop-back action of the switch, a two-step relay being provided to enable trunk hunting responsive to a third train of digit impulses after the first two trains of digit impulses incoming to the switch have been absorbed.

The drawing shows schematically a telephone system comprising a two-motion digit absorbing selector 30 arranged in accordance with the invention. The system shown comprises subscriber telephone stations A and B of the common battery type, and line finder, selector and connector switches of the two-motion step-by-step type. A dial is shown at station A for use in controlling selector and connector switches to establish desired connections. Each subscriber's line is connected to sets of terminals in the banks of a group of line finder switches and also to sets of terminals in the banks of a group of connector switches, one switch of each of these groups being represented in the drawing by a set of brushes and a single set of terminals. The station A is shown connected by line $L_1$ to a set of terminals 14 in the bank of line finder switch 10 and the station B is shown connected by line $L_2$ to a set of terminals 54 in the bank of connector switch 50. Each of the line finder switches in a group is individually connected to a first selector, the line finder 10 being individually connected to the first selector switch 20. The selector 20 is represented by a set of brushes and two sets of terminals 24 and 25. The terminal set 24 represents a group of terminals giving access to second selectors which are arranged for digit absorbing, the second selector 30 which is individually connected to terminals 24 being shown in detail. The terminal set 25 represents a group of terminals which are connected to trunks leading to another dial office of the system. Each of the second selectors, represented by the selector 30, has access to groups of connectors; and each connector has access to a hundred sets of line terminals. The bank of the selector 30 is represented by the single set of terminals 34 which is individually connected to the connector 50.

Reference may be had to "Automatic Telephony" by Smith and Campbell, 2nd edition, pages 53 to 65, for a complete description of two-motion step-by-step switches and their operation when used as selectors and connectors. Reference may be had to Patent 1,799,654, granted April 7, 1931 to R. L. Stokely for a complete description of the operation of a two-motion step-by-step line finder.

The second selector 30 comprises, in addition to its terminal bank, a set of brushes 31, 32 and 33 mounted on a shaft adapted for vertical and rotary movement, a vertical stepping magnet 35, a rotary stepping magnet 36, a release magnet 37, a set of contact springs VON which are actuated when the shaft is moved out of its normal position, and a set of springs 40 which are actuated when the shaft is rotated into the eleventh rotary step position out of engagement with the last set of terminals in any level. Individually associated with the selector switch are a line relay 41, a release relay 42, a change-over relay 43, a switching relay 44, a rotary-stepping relay 45, and a two-step digit-absorbing control relay 46.

Assume that a call has been initiated at Station A, that the line finder 10 has connected the line $L_1$ to the associated first selector 20, and that the first selector 20 has been selectively operated responsive to the dialing of the first digit of the called number by the subscriber at station A to select the terminals 24, all of these operations taking place in usual and well-known manner. The line relay 41 of selector 30 is thereupon operatively energized in a circuit which is traced from battery through the lower winding of relay 41, outer lower back contact of relay 44, conductor 28, engaged terminal and brush 22 of first selector 20, brush 12 and engaged terminal of line finder 10, over the calling subscriber's loop including the impulse contacts of the dial at station A, engaged terminal and brush 11 of line finder 10, brush 21 and engaged terminal of selector 20, conductor 27, outer upper back contact of relay 44, upper winding of relay 41 and upper back contact of the eleventh rotary step springs 40 to ground. The operation of relay 41 closes a circuit for operating release relay 42. Relay 42 connects ground to conductor 29 thereby to guard the switch 30 against seizure by any other hunting selector and to maintain the line finder and selector switches 10 and 20 in operated position connecting the line $L_1$ to the selector 30. No further action occurs until the calling subscriber dials the second digit of the number of the station which is being called, relay 41 being thereupon successively released and reoperated as many times as there are units in the digit dialed. Relay 42 is slow in releasing and remains operated during the receipt of dial impulses. The first release of relay 41 closes a circuit from ground at the inner upper back contact of relay 44, through the back contact of relay 41, upper front contact of relay 42, winding of relay 43 and through the winding of vertical stepping magnet 35 to battery, thereby operating relay 43 and the stepping magnet 35. The operation of stepping magnet 35 raises the shaft and brushes of switch 30 one step, the vertical off-normal springs VON being actuated as soon as the shaft moves out of normal position. The actuation of springs VON closes a circuit for operating relay 45, this circuit being traced from the winding of relay 45 through the lower normally-closed contact of the eleventh rotary step springs 40, middle front contact of the VON springs, and front contact of relay 43, to ground at the continuity back contact of release magnet 37. Relay 45 locks independent of relay 43 in a circuit traced from its winding through the lower back contact of springs 40, middle front contact of vertical off-normal springs VON, back contact of rotary stepping magnet 36, and outer front contact of relay 45 to ground at a front contact of relay 42. The reoperation of line relay 41 at the end of the first impulse opens the energizing circuit for relay 43 and stepping magnet 35. The stepping magnet 35 releases immediately but relay 43 is slow to release and remains operated during the receipt of all of the impulses in a train. The release and reoperation of relay 41 responsive to each succeeding impulse of the train causes a corresponding operation and release of vertical stepping magnet 35; whereby the brushes 31, 32 and 33 of selector 30 are advanced step-by-step to the level corresponding to the digit dialed. When relay 43 releases after the last impulse of the digit has been received, a circuit is closed for operating the release magnet 37, this circuit being traced from the winding of release magnet 37, through contact 39 of the vertical off-normal springs VON, back contact of relay 46, inner front contact of relay 45, and the continuity back contact of relay 43 to ground at the continuity back contact of release magnet 37. The operation of release magnet 37 causes the release of the shaft and brushes of switch 30, gravity being effective to return them to normal position. Release magnet 37 is locked operated through contact 39 of the VON springs until the shaft reaches normal, at which time the locking circuit of relay 45 and the locking circuit of release magnet 37 are opened by the return of the vertical off-normal springs VON to normal. The vertical off-normal springs VON are adjusted so that contact 38 is closed before the contact 39 opens, so as to cause the energization of the winding of relay 46, when the shaft is restored to normal. The circuit for energizing the winding of relay 46 includes resistor 47, contact 38, the lower front contact of release magnet 37, outer front contact of relay 45 and a front contact of relay 42. The energization of the winding of relay 46 in series with resistor 47 closes the lower and the inner upper front contacts of this relay without actuating its continuity springs; and this partial actuation of relay 46 is maintained, after release magnet 37 releases, through resistor 47 to ground at a front contact of relay 42.

When the subscriber dials the next digit of the called subscriber's number, relay 41 is again alternately released and reoperated as many times as there are units in the digit dialed, thereby causing the reoperation of relay 43 and the operation and release of vertical stepping magnet 35 responsive to each impulse in the train. The brushes 31, 32 and 33 of selector switch 30 are thereby stepped to the corresponding level, relay 45 is reoperated as before described, and the vertical off-normal springs VON are actuated as soon as the shaft moves out of its normal position. When relay 43 releases after the last impulse of the train has been received, the release magnet 37 is again operated and locked; and, since relay 46 is already partially actuated, a circuit is closed by the operation of release magnet 37 for completing the operation of relay 46. This circuit is traced from the winding of relay 46 through its lower front contact, the lower front contact of the vertical off-normal springs VON, lower front contact of release magnet 37, and outer front contact of relay 45, to ground at a front contact of relay 42. The winding of relay 46 is thus energized sufficiently to complete the actuation of all contacts; whereby the rotary stepping magnet 36 is conditioned for operation at the end of the next train of digit impulses received by relay 41. When the vertical off-normal springs restore to normal, relay 45 releases and the release magnet 37 releases but relay 46 is held operated with all contacts actuated by the circuit which includes resistor 47 and the inner upper front contact of relay 46 to ground at a front contact of relay 42. When the calling subscriber dials the next digit of the called subscriber's number, relays 41, 43 and 45 operate as hereinbefore described and the vertical stepping magnet 41 steps the brushes 31, 32 and 33 up to the level corresponding to the digit dialed. When relay 43 releases after the last impulses of this train of digit impulses has been received, the circuit for operating rotary stepping magnet 36 is completed, this circuit being traced from the winding of magnet 36 through the outer upper front contact of the relay 46, inner front contact of relay 45 and continuity back contact of relay 43, to ground at the continuity back contact of release magnet 37. The operation of the stepping magnet 36 advances the brushes of switch 30 into engagement with the first set of terminals in the selected level and causes the release of relay 45; and the release of relay 45 causes the release of stepping magnet 36. If the first set of terminals in the selected level tests busy, relay 45 reoperates in a circuit traced from its winding through the lower back contact of springs 40, middle front contact of the vertical off-normal spring VON, back contact of rotary stepping magnet 36, lower back contact of release magnet 37, inner lower back contact of relay 44, test brush 33 and engaged terminal, to busy marking ground in the associated connector. The reoperation of relay 45 again closes the circuit for operating rotary stepping magnet 36, thereby advancing the brushes of selector 30 to the next set of terminals in the selected level. In like manner, the brushes are advanced step by step until an idle set of terminals is reached. When brush 33 engages a terminal which is not connected to ground, relay 44 operates in a circuit traced from battery through the winding of relay 45, lower back contact of springs 40, middle front contact of springs VON, back contact of rotary stepping magnet 36, lower back contact of release magnet 37, and winding of relay 44, to ground at a front contact of relay 42. Relay 45 is marginal and does not reoperate in series with relay 44. The operation of relay 44 disconnects the windings of line relay 41 from the calling line, and connects the calling line through conductors 27 and 28 and brushes 31 and 32 to the connector 50. With relay 44 operated, ground from the outer lower front contact of relay 42 is connected through the inner lower front contact of relay 44 and brush 33 to the engaged terminal thereby to mark the associated connector busy to any other selector which may be searching for an idle connector until holding ground is supplied from the connector circuit in usual and well-known manner. Relay 41 releases followed by the delayed release of relay 42. When relay 42 releases, relay 46 releases; but relay 44 is held operated by the holding ground supplied in the connector circuit to the terminal engaged by brush 33. This ground is also effective to hold the selector 20 and line finder 10. When the calling subscriber dials the last two digits of the called subscriber's number, the connector switch 50 is selectively operated to establish connection with the called line $L_2$. The called line is tested in the usual manner; and, if the line is idle, ringing current is transmitted over the line to signal the subscriber's station at station B. When the called subscriber answers, the ringing circuit is opened and the talking connection between the calling and called stations is completed in the connector circuit.

When the calling subscriber replaces the receiver on the receiver hook, the line relay of the connector circuit releases; and ground is thereupon disconnected from the terminal engaged by brush 33, causing the release of relay 44 of selector 30 and the return of the selector 20 and line finder 10 to normal in usual and well-known manner. The release of relay 44 closes a circuit from ground at the inner upper back contact of relay 44, through back contacts of relays 41 and 42 and contact 39 of springs VON for operating release magnet 37. The operation of release magnet 37 releases the shaft and the switch is restored to normal position. When the VON springs are restored to normal, the locking circuit of release magnet 37 is opened and this magnet is deenergized.

In case all of the terminals are busy in the level selected responsive to the third digit impulses received by selector 30, the eleventh rotary step springs 40 are actuated when the brushes are rotated to the eleventh rotary position, thereby connecting the busy tone source to the calling line. When the calling subscriber releases, relays 41, 42 and 46 release, the release magnet 37 is operated and the selector 30 is restored to normal as above described.

What is claimed is:

1. In combination with a selector switch comprising a multilevel bank of terminals, a set of wipers, vertical and rotary stepping magnets for selectively positioning said wipers to engage any set of terminals in said bank, a set of contact springs actuated when said wipers are moved out of normal position, and a release magnet for effecting the return of the wipers to normal position, means comprising an impulse relay for controlling the operation of the vertical stepping magnet, means comprising a control relay for controlling the operation of the rotary stepping magnet, means including a normally open contact of said set of contact springs and a normally closed contact of said control relay for operating said release magnet at the end of each of the first two trains of impulses incoming to said impulse relay, means comprising a normally closed contact of said set of contact springs and a front contact of said release magnet for partially energizing the winding of said control relay to actuate certain of its contacts without actuating other contacts which control the operation of said rotary stepping and release magnets, said set of contact springs being adjusted so that said normally closed contact closes before said normally open contact opens when the set of contact springs is restored to normal, said normally open contact of said set of contact springs causing the release of said release magnet when said set of contact springs is restored to normal, means comprising one of said certain contacts of said control relay for maintaining said partial energization of said control relay after said release magnet releases following receipt of the first train of impulses incoming to said impulse relay, means including another of said certain contacts of said control relay and a normally open contact of said set of contact springs for causing the complete energization of said control relay when said release magnet operates following receipt of a second train of impulses incoming to said impulse relay, thereby to prevent the operation of said release magnet and to enable the operation of said rotary stepping magnet following the receipt of a third train of impulses incoming to said impulse relay to position the wipers in engagement with an idle set of terminals in the selected level of said bank.

2. In combination with a selector switch comprising a multilevel bank of terminals, a set of wipers, vertical and rotary stepping magnets for selectively positioning said wipers to engage any set of terminals in said bank, means including an impulse relay for controlling the operation of said vertical stepping magnet, a release magnet for effecting the return of said wipers to normal, a two-step control relay having a normally open contact and a normally closed contact and other contacts, means including said normally closed contact of said two-step relay for operating said release magnet at the end of a train of impulses incoming to said impulse relay, means for partially energizing said two-step relay to actuate said other contacts of said two-step relay without actuating said normally open and said normally closed contacts, circuit means comprising said other contacts of said two-step relay and a normally open contact of said release magnet for completing the energization of said two-step relay to effect the actuation of all of the contacts of said two-step relay responsive to the operation of said release magnet at the end of the second train of impulses incoming to said impulse relay, and means including said normally open contact of said two-step relay for operating said rotary stepping magnet at the end of the third train of impulses incoming to said relay to select the first idle set of terminals in the selected level of the bank.

3. In combination with a two-motion selector switch comprising a multilevel terminal bank, a set of wipers, vertical and rotary stepping magnets for advancing said wipers to connect with any set of terminals in said bank, and a release magnet for effecting the return of the wipers to normal position, an impulse relay for receiving impulses, means comprising said impulse relay for controlling the operation of said vertical stepping magnet, a two-step relay having contacts closed by the partial energization of its winding and having other contacts actuated only by complete energization of its winding, circuit means including a back contact of said other contacts of said two-step relay for operating said release magnet to return the wipers to normal following receipt of each of two trains of impulses incoming to said impulse relay, means for partially energizing said two-step relay responsive to the operation of said release magnet following receipt of the first train of impulses, means including a contact closed by partial energization of said two-step relay for completing the energization of said two-step relay responsive to the operation of said release magnet following receipt of the second train of impulses, and means comprising another of the contacts actuated only by complete energization of the two-step relay for enabling the operation of said rotary stepping magnet following the receipt of a third train of impulses incoming to said impulse relay.

ARTHUR CARSON.
EARLE TABOR CRONK.

REFERENCES CITED

The following references are of record in the file of this patent:

UNITED STATES PATENTS

| Number | Name | Date |
|---|---|---|
| 1,694,615 | Bellamy | Dec. 11, 1928 |